United States Patent
Rahat et al.

(10) Patent No.: US 11,576,090 B2
(45) Date of Patent: Feb. 7, 2023

(54) MME BASED HANDOVER DECISION

(71) Applicant: T-Mobile USA, Inc., Bellevue, WA (US)

(72) Inventors: Adnan Rahat, Renton, WA (US); Shujaur Mufti, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 21 days.

(21) Appl. No.: 16/914,108

(22) Filed: Jun. 26, 2020

(65) Prior Publication Data

US 2021/0410022 A1    Dec. 30, 2021

(51) Int. Cl.
*H04W 36/00* (2009.01)

(52) U.S. Cl.
CPC .............................. *H04W 36/0058* (2018.08)

(58) Field of Classification Search
CPC . H04W 36/14; H04W 36/00; H04W 36/0005; H04W 36/0058; H04W 36/00837; H04W 84/12; H04W 36/0016; H04W 36/0085; H04W 36/385; H04W 36/0022; H04B 17/318; H04B 17/327; H04B 17/382
See application file for complete search history.

(56) References Cited

U.S. PATENT DOCUMENTS

| | | | |
|---|---|---|---|
| 7,379,739 B2 | 5/2008 | Rajkotia et al. | |
| 9,088,925 B1* | 7/2015 | Chen | H04W 36/24 |
| 2011/0216743 A1* | 9/2011 | Bachmann | H04L 63/164 |
| | | | 370/331 |
| 2020/0059983 A1* | 2/2020 | Stauffer | H04W 36/0066 |
| 2022/0174682 A1* | 6/2022 | Li | H04W 72/0446 |

* cited by examiner

*Primary Examiner* — Quoc Thai N Vu
(74) *Attorney, Agent, or Firm* — Han Santos, PLLC

(57) ABSTRACT

Techniques are described herein for handling handover requests from a user device. The techniques include receiving a handover request from a user device connected to a first access network and identifying an evolved packet data gateway (ePDG) serving the user device. The user device provides to the ePDG, measurement reports indicating network conditions. The techniques further include receiving the measurement report from the ePDG and determining whether a measurement in the measurement report is above a predetermined threshold. If the measurement is above the predetermined threshold, the handover request is accepted to enable the user device to connect to a second access network.

18 Claims, 9 Drawing Sheets

MME BASED HANDOVER DECISION

BACKGROUND

Many mobile devices such as smartphones access both non-cellular and cellular networks. These mobile devices may disconnect from one network in order to switch to another network. Switching from one network to another is called a handover, and mobile devices are generally configured to automatically switch networks when various network conditions are met. For example, mobile devices may switch from slow or unreliable Wi-Fi networks in order to switch to a $3^{rd}$ Generation Partnership Project (3GPP) network such as Long-Term Evolution (LTE). However, when the available cellular signal is marginal or unstable, transitioning from Wi-Fi to LTE too early can result in a poor or dropped connection. Thus, when handover is triggered in mobile devices, the performance of the cellular network should be determined in order to improve the automatic handover in mobile devices.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

Figure 1:
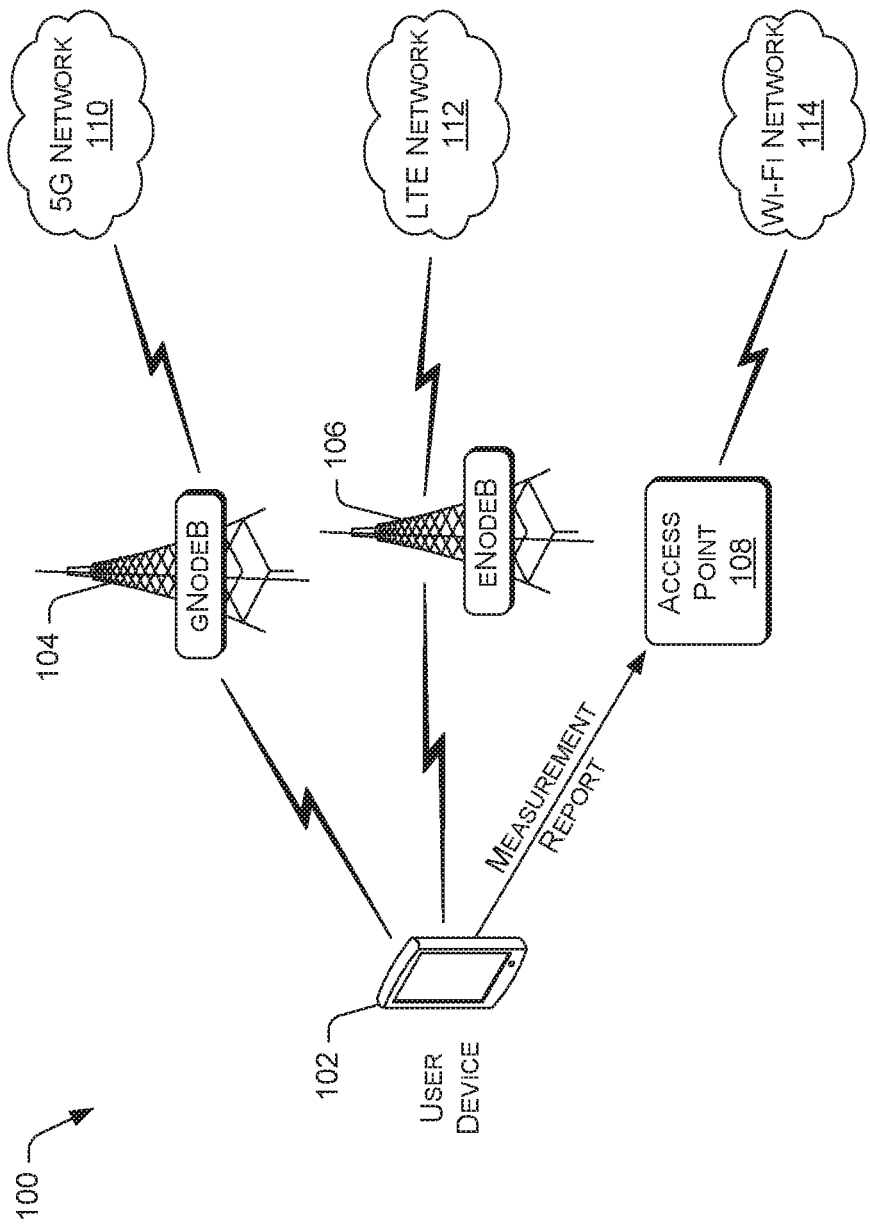
FIG. 1 illustrates an example system for managing handover requests for a user device connected to multiple networks, in accordance with some examples of the present disclosure.

This disclosure is directed to techniques for improving Wi-Fi calling performance during the handover process between non-cellular and cellular networks. The handover process includes an attach procedure as defined in 3GPP specification TS 23.401. Handover can be classified into different types based on various aspects involved. In horizontal handover, mobile devices move from one access point to another of the same type. In vertical handover, user devices move from an access point of one type to a different type. The present disclosure is directed to handover from a first radio access technology (RAT) (e.g., Wi-Fi) to a second RAT (e.g., LTE, 5G, beyond 5G [B5G], etc.), which is a vertical handover. A handover may be mobile-initiated or network-initiated, depending on who initiated the handover process. The present disclosure is directed to mobile-initiated handover.

Additionally, handover can be mobile-controlled or network-controlled depending on who has primary control of the process. Further, handover can be also classified based on where it obtains information used to decide to initiate handover. For example, if a handover is network-controlled and information collected by the user device is used to assist, then the handover is mobile-assisted. Conversely, if a handover is mobile-controlled and uses information from the network, the handover is network-assisted. In various embodiments, the present disclosure is directed to a mobile-assisted handover.

In some aspects, the techniques include receiving a handover request from a user device. The user device may be initially connected to a network over one or more air interfaces and according to one or more RAT, such as Wi-Fi. The user device may request to connect to a 3GPP network via a second RAT, such as LTE. In the LTE network, several rounds of communication can be undertaken by various network nodes, such as an MME, a Home Location Register (HLR)/a Home Subscriber Server (HSS), evolved Packet Data Gateway (ePDG), etc., for handover to be possible.

The MME may identify the ePDG that is serving the user device requesting handover via the HSS, which stores the ePDG address serving the user device. Upon identifying the ePDG that is serving the requesting user device, the MME may interface with the ePDG. For the sake of clarity, a pseudo-acronym "S1x" or "new S1" has been defined to represent a new interface that is configured for communication between the ePDG and the MME. The requesting user device may provide measurement reports to the ePDG. In some aspects, the requesting user device may report received signal strength or power of reference signals (e.g., received signal strength indication [RSSI], reference signals received power [RSRP], reference signal received quality [RSRQ], etc.) at regular intervals to the ePDG. The ePDG may relay the measurement reports to the MME via the S1x interface. Based at least on the measurement reports, the MME may reject or accept the handover request from the user device.

In some aspects, the user device requesting handover may be initially connected to a Wi-Fi network and then select a second RAT to connect to a cellular network, wherein the second RAT may be 5G. In the 5G network, several rounds of communication can be undertaken by various network nodes, such as an AMF, Non-3GPP Interworking Function (N3IWF), Unified Data Function (UDM), etc., for handover to be possible.

The AMF may identify the N3IWF handling the user device session. Upon identifying the N3IWF serving the requesting user device, the AMF may communicate with the N3IWF via the N2 interface. The requesting user device may provide measurement reports to the N3IWF. In turn, the N3IWF may communicate the measurement reports to the AMF. The AMF may reject or accept the handover request from the user device based at least on the measurement reports.

Because a handover decision at the MME or the AMF is based on measurement reports of network conditions from the requesting user device, it is less likely that a poor or dropped connection will result after the completion of the handover process. The techniques described herein may be implemented in a number of ways. Example implementations are provided below with reference to the following figures.

Example Network Architectures

FIG. 1 illustrates an example system 100 for managing handover requests for a user device connected to multiple networks. The system 100 includes a user device 102 that can comprise smartphones, mobile devices, personal digital assistants (PDAs), desktop computers, laptops, tablets, smartwatches, or other electronic devices having a wireless communication function that are capable of receiving input, processing the input, and generating output data. The user device 102 may be equipped with multiple transceivers to connect to multiple wireless networks.

The user device 102 is configured to communicate with an access network over a physical communications interface or layer, which can include air interfaces and/or a direct-wired connection. The user device 102 may connect to any sort of access networks, such as a Global System for Mobile Communications (GSM) or Universal Mobile Telecommunications System (UMTS) network, a universal terrestrial radio network (UTRAN) or an Enhanced Data rates for GSM Evolution (EDGE) radio access network (GERAN), an evolved universal terrestrial radio access network (E-UTRAN), a 2G, 3G, 4G, 5G, LTE, LTE advanced network, a Wi-Fi (IEEE 802.11) or other LAN access network, or a satellite or terrestrial wide-area access network.

The user device 102 may connect to the wireless networks via multiple wireless base stations. For instance, the user device 102 may connect to 5G network 110 and LTE network 112 via gNodeB 104 and eNodeB 106, respectively. The network architecture of the LTE network 112 is described further in FIG. 2, and the network architecture of the 5G network 110 is described further in FIG. 4. In other embodiments, a single base station can include multiple transceivers, with at least one transceiver on each network (e.g., 3G, 4G, LTE, 5G). Additionally, the user device 102 can be configured to connect to additional networks via Wi-Fi, Bluetooth, and other connections.

The user device 102 may also communicate via a Wi-Fi access point (AP) 108 or other network devices that are the initial node that the user device 102 communicates with to access the services of a corresponding access network. The user device 102 may connect to different networks (e.g., 5G network 110, LTE network 112, Wi-Fi network 114) as a user moves in and out of coverage areas of individual access networks. While FIG. 1 illustrates a user device 102 operating on 5G network 110, LTE network 112, and Wi-Fi network 114, the present disclosure is not so limited, and the user device 102 may operate on other types of networks with disparate power levels, propagation distances, or other differences.

In one aspect, the user device 102 may be initially connected to the Wi-Fi network 114 over one or more air interfaces (not pictured). The user device 102 may transmit a handover request to connect to a different network such as the 5G network 110 or the LTE network 112. The user device 102 may provide measurement reports to one or more network entities in the 5G network 110 or the LTE network 112. For instance, the measurement reports can include received signal strength or power of reference signals (e.g., RSSI, RSRP, RSRQ, etc.). These measurements may be provided to an N3IWF of the 5G network 110 or an ePDG of the LTE network 112, depending upon embodiments. Based at least on the measurement reports, the AMF or the MME may reject or accept the handover request from the user device. Handover processes from the Wi-Fi network 114 to the 5G network 110 and from the Wi-Fi network 114 to LTE network 112 are further described below.

LTE Network Architecture

Figure 2:
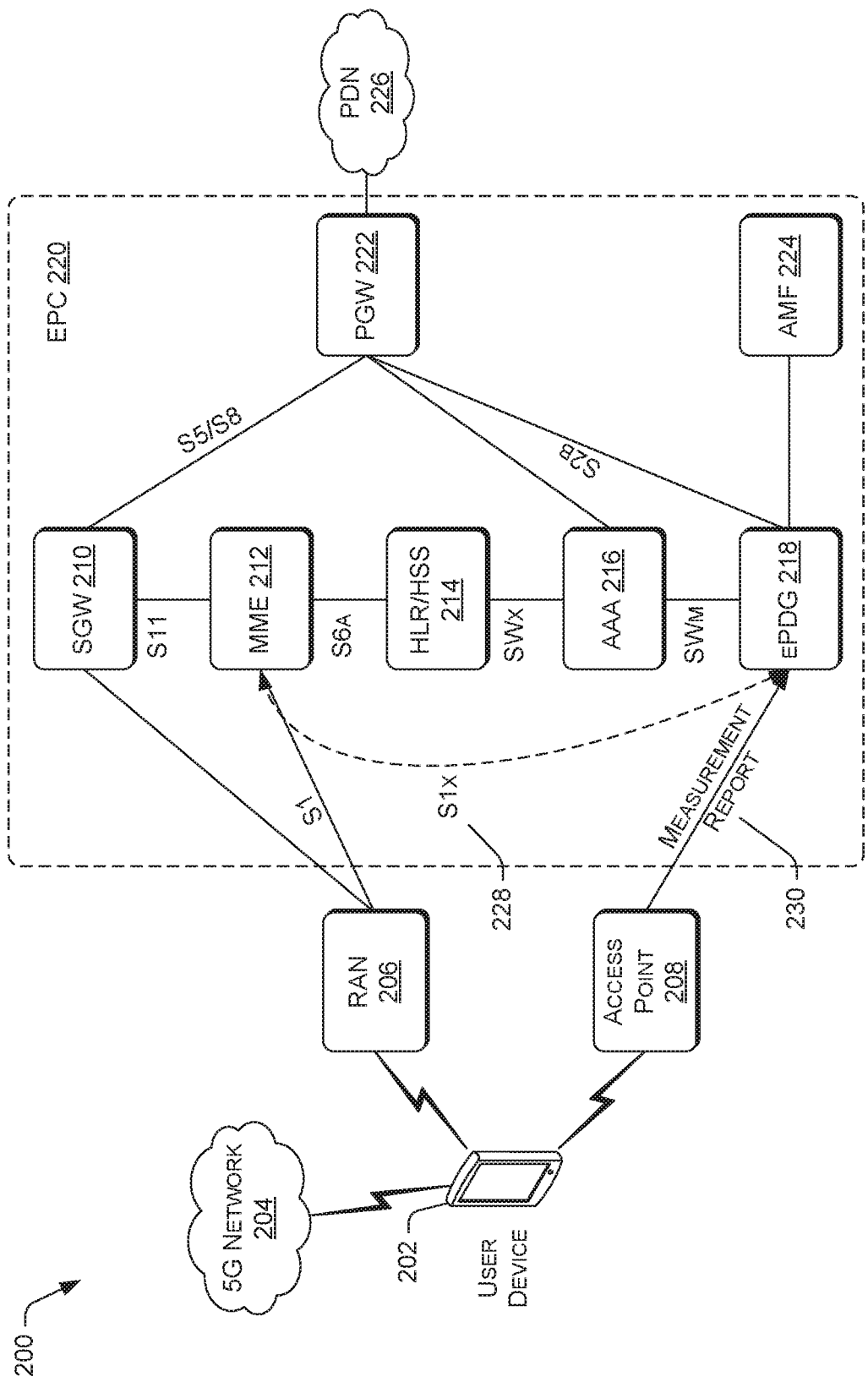
FIG. 2 illustrates an example of an LTE network architecture for processing handover requests.

FIG. 2 illustrates an example of an LTE network architecture 200 for processing handover requests from user devices. The architecture 200 may include a user device 202 that may correspond to the user device 102 of FIG. 1. FIG. 2 includes a radio access network (RAN) 206. The RAN 206 includes a plurality of access points that serve the user device 202 over air interfaces (not pictured). The access points in the RAN 206 can be referred to as access nodes (ANs), access points (APs), base stations (BSs), NodeBs, eNodeBs, and/or so forth. The RAN 206 can include the eNodeB 106 of FIG. 1. These access points can be terrestrial access points (or ground stations), or satellite access points.

The RAN 206 is configured to connect to the evolved packet core (EPC) 220 that can perform a variety of functions, including bridging circuit-switched (CS) calls between the user device 202 served by the RAN 206 and other user devices (not pictured) served by the RAN 206 or a different RAN (not pictured), and can also mediate an exchange of packet-switched (PS) data with external networks such as a public data network (PDN) 226 (e.g., Internet). The PDN 226 includes a number of routing agents and processing agents (not shown). The user device 202 may also be directly connected to a modem or router (e.g., Wi-Fi router), which can correspond to the access point 208. The access point 208 can correspond to the access point 108 of FIG. 1.

FIG. 2 further includes a Serving Gateway (SGW) 210, an MME 212, an HLR/HSS 214, and a PDN Gateway (PGW) 222. The PGW 222 includes a network device that acts as a router and gateway between the EPC 220 and the PDN 226, and forwards session data between the PDN 226 and a base band unit in the EPC 220. The SGW 210 includes a network device that routes and forwards session data between the PGW 222 and the RAN 206 serving the session's destination user device 202.

The MME 212 can register or unregister user device 202 with the network, to establish user plane bearer channels, to hand off the user device 202 to different eNodeBs, MMEs, other networks, and/or to perform other operations. The MME 212 may perform policing operations on traffic destined for and/or received from the user device 202. The MME 212 may also authenticate a user by interacting with the HLR/HSS 214 and creating billing records. The MME 212 may further provide the user device 202 with mobility management and session management functions using, for example, Network Access Stratum (NAS) signaling.

The HLR/HSS 214 is a database that contains user-related and subscription-related information. The HLR/HSS 214 includes a user's telephone number (i.e., Mobile Subscriber Integrated Services Digital Network [MSISDN] number) and a user's International Mobile Subscriber Identity (IMSI) that uniquely identifies a subscriber. The IMSI can identify the subscription that is associated with a user. The IMSI includes the Mobile Country Code (MCC) and the Mobile Network Code (MNC). A copy of the IMSI is also stored on the subscriber identity module (SIM) card of the user device 202 that is associated with the subscribers. The HLR/HSS 214 also includes authentication information that is used to authenticate the subscriber and to generate encryption keys on a session basis, Access Point Names (APNs) that the subscriber is allowed to use, IMS-specific information, and/or so forth. Thus, the functions of the HLR/HSS 214 include functionalities such as mobilities management, call and session establishment support, user authentication and access authorization, and/or so forth.

The ePDG 218 may authorize and authenticate user device 202 with the HLR/HSS 214 via the Authentication, Authorization, and Accounting (AAA) server 216. The HLR/HSS 214 may store the address of the ePDG 218 that is serving the user device 202. The ePDG 218 receives, from the user device 202, measurement report 230 indicating network conditions, such as network edge conditions or end-to-end conditions, such as radio frequency (RF) conditions. The ePDG 218 may interface with the MME 212 via the S1x interface 228 to deliver the measurement report 230 to the MME 212.

The AAA server 216 may perform authentication, authorization, and accounting functions for an untrusted device connecting to the access network. For example, the AAA server 216 may communicate with the HLR/HSS 214 via a Diameter protocol to perform authentication and/or authorization of the user device 202. The ePDG 218 may send a Diameter Extensible Authentication Protocol (EAP) Request (DER) to the AAA server 216 to authenticate and authorize the user device 202 using the identity and APN information associated with the user device 202.

The AAA server 216 may request subscriber information for the user device 202 from HLR/HSS 214 using a Multimedia Authorization Request (MAR), and HLR/HSS 214 may respond with a Multimedia Authorization Answer (MAA) providing the requested subscriber information. After obtaining the subscriber information, the AAA server 216 may send an authentication challenge with a Diameter EAP Answer (DEA) message.

The EPC 220 further includes an AMF 224, which serves part of the role of the MME 212. The AMF 224 performs user device-based authentication, authorization, and mobility management for the user device 202 and maintains a NAS signaling connection with the user device 202 and manages the user device registration procedure. The AMF 224 is also responsible for paging. The RAN 206 and the EPC 220 are set to interwork with the New Radio (NR) and the Next Generation Core Network (NGCN) of the 5G network 204, which will be discussed in detail with respect to FIG. 4.

Figure 3:
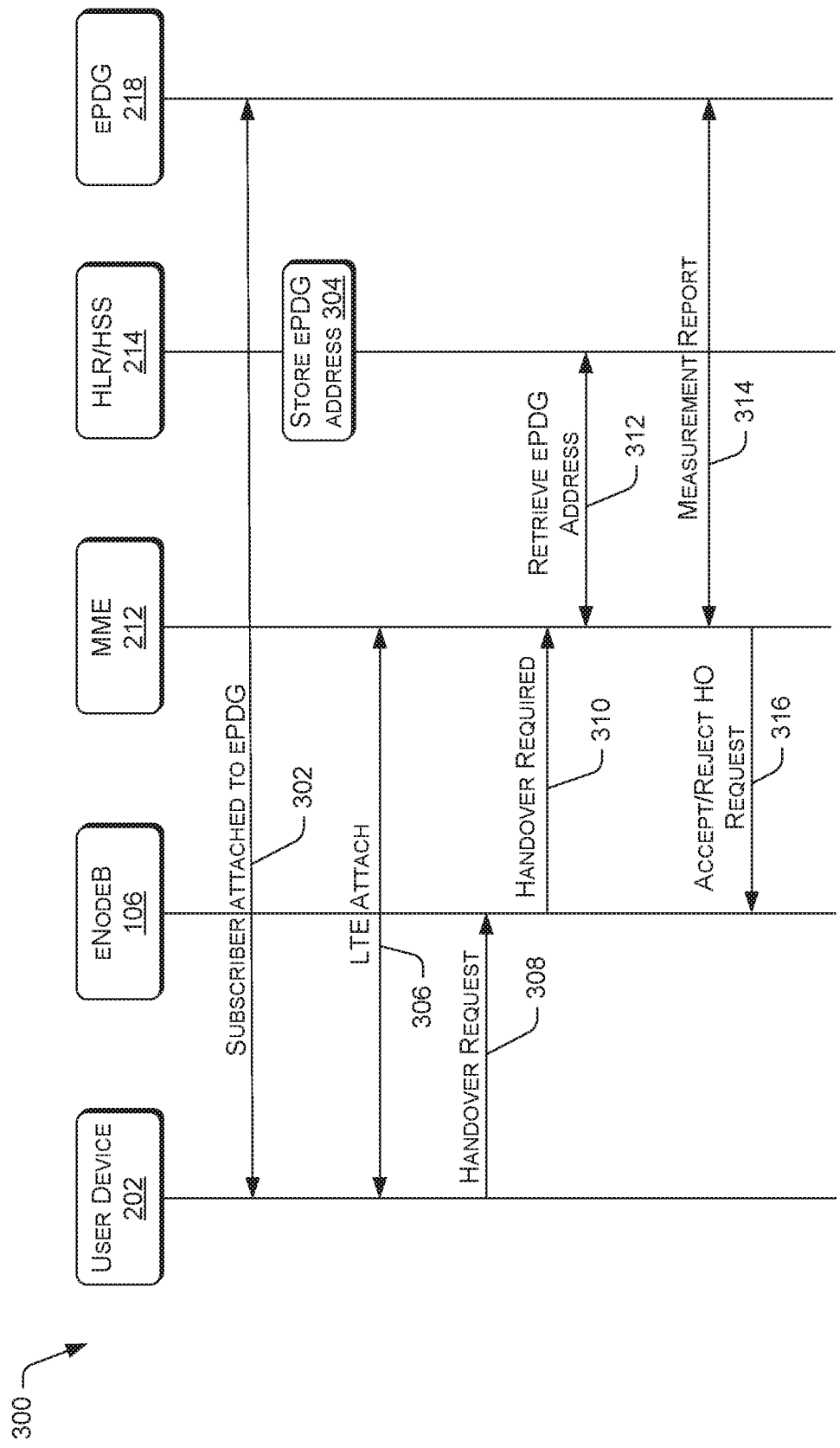
FIG. 3 is a protocol flow diagram showing an example handover process from a Wi-Fi network to an LTE network.

In one aspect, the user device 202 may request a handover between access networks. For instance, the user device 202 may request a handover from a Wi-Fi network to the LTE network. A protocol flow diagram showing an example handover process from the Wi-Fi network to the LTE network is shown in FIG. 3.

At 302, the user device 202 that is associated with a subscriber is attached to the ePDG 218. The user device 202 may provide measurement reports to the ePDG 218, wherein the measurement reports can indicate network conditions (e.g., RF conditions). In some aspects, the user device 202 may report received signal strength or power of reference signals (e.g., RSSI, RSRP, RSRQ, etc.) at regular intervals to the ePDG 218.

At 304, the HLR/HSS 214 stores ePDG address (e.g., Internet Protocol [IP] address, MAC address, port number, etc.) of the ePDG 218 that is serving the user device 202. At 306, the user device 202 may perform LTE attach procedures. At 308, the user device 202 may send a handover request to a base station. The base station can be a part of the RAN 206 as described in FIG. 2. The base station is configured to wirelessly interface with the user device 202 to enable access to the core network, the Internet, and/or other networks. The base station may include one or more radio access nodes, a base transceiver station (BTS) or a base station controller (BSC), a Node-B (NodeB), an evolved NodeB (eNodeB), a Home NodeB, a Home eNodeB, a site controller, an access point (AP), or a wireless router, or a server, router, switch, or other processing entity with a wired or wireless network. In the illustrated embodiment, the base station comprises eNodeB 106.

At 310, the eNodeB 106 transmits a handover-required message to the MME 212. The MME 212 may first identify the ePDG 218 that is serving the user device 202 requesting handover. At 312, the MME 212 may retrieve the ePDG address of the ePDG 218 serving the user device 202 from the HLR/HSS 214. Upon identifying the ePDG 218 that is serving the user device 202, the MME 212 may interface with the ePDG 218 via the S1x interface to request and receive the measurement reports as shown at 314. The measurement reports include one or more measurements obtained via the user device 202 indicating network conditions in real-time or near real-time. For instance, the measurements may indicate whether the available cellular signal is marginal or unstable. Therefore, the MME 212 can determine whether transitioning from Wi-Fi to LTE may likely be successful or result in a poor connection. Based on the measurements in the measurement reports, the MME 212 may reject or accept the handover request from the user device 202 at 316.

5G Network Architecture

Figure 4:
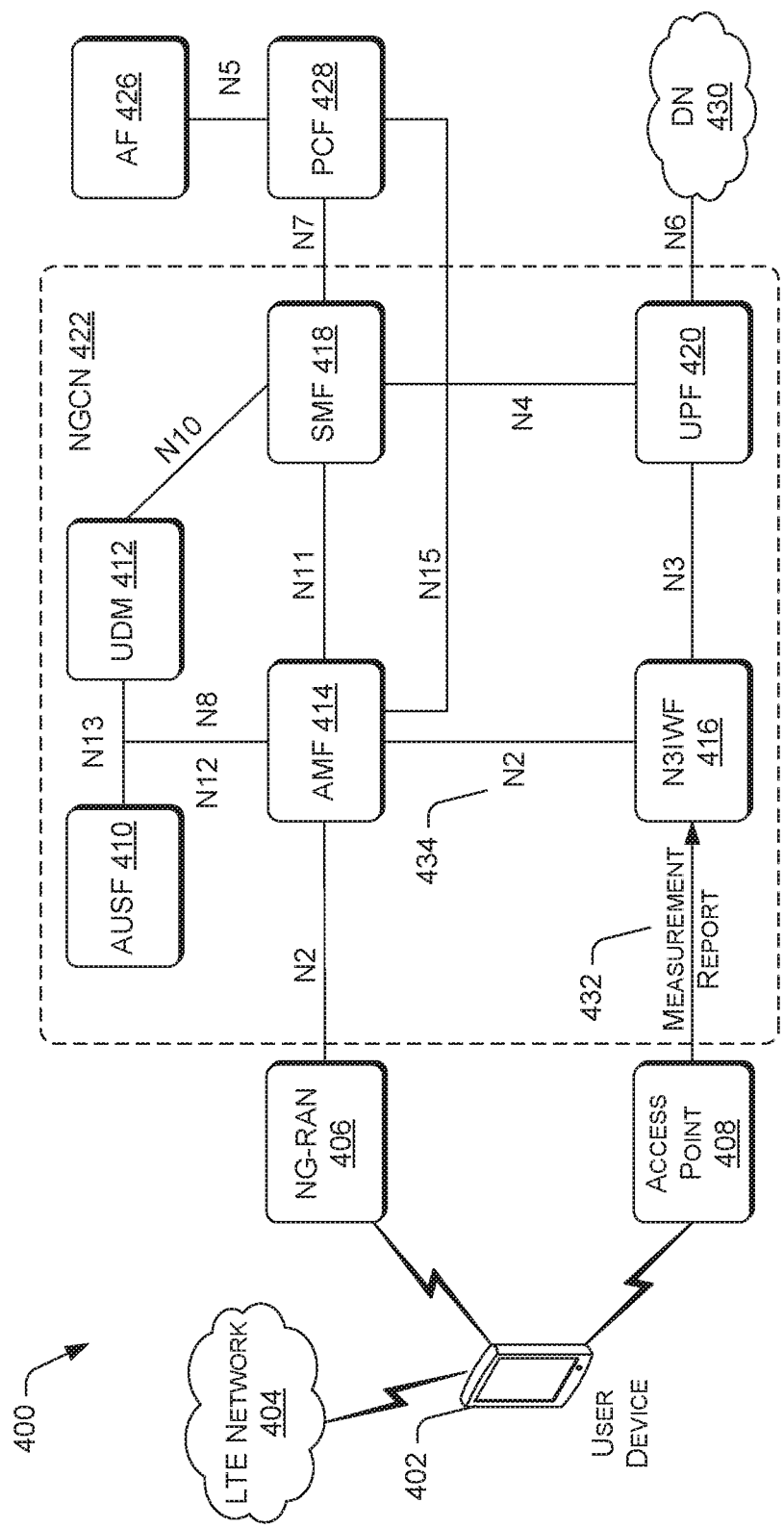
FIG. 4 illustrates an example of a 5G network architecture for processing handover requests.

FIG. 4 illustrates an example of a 5G network architecture 400 for processing handover requests from user devices. Similar to the LTE network architecture as described in FIGS. 2 and 3, the 5G network architecture 400 includes a user device 402 that is configured to communicate with an access network. The user device 402 may correspond to the user device 102 and 202 of FIGS. 1 and 2, respectively. FIG. 4 includes a Next Generation RAN (NG-RAN) 406. The NG-RAN 406 may implement any suitable wireless communication technology or technologies to provide radio access to the user device 402. For instance, the NG-RAN 406 may operate according to 3GPP NR specifications (i.e., 5G). The NG-RAN 406 includes a plurality of access points that serve the user device over air interfaces. In the illustrated embodiment, the access points in the NG-RAN 406 include base stations such as the gNodeB 104 of FIG. 1. The user device 402 may also be directly connected to a modem or router (e.g., Wi-Fi router), which can correspond to the access point 408. The access point 408 may correspond to the access point 108 and 208 of FIGS. 1 and 2, respectively.

The NG-RAN 406 is configured to connect to the NGCN 422, which replaces the EPC 220 of FIG. 2 in the LTE network. The NG-RAN 406 and the NGCN 422 are set to interwork with RAN and EPC of the LTE network 404, which are described above with respect to FIG. 2. The NGCN 422 includes an AMF 414, Session Management Function (SMF) 418, and User Plane Function (UPF) 420. The AMF 414 provides functions such as NAS security, idle state mobility handling, and/or so forth. The AMF 414 provides functions including those of the MME 212 in FIG. 2 of the LTE network. The AMF 414 connects to the Authentication Server Function (AUSF) 410 and the Unified Data Function (UDM) 412. The AUSF 410 provides functions including those of the MME 212 and AAA 216 in FIG. 2 of the LTE network.

Additionally, AUSF 410 manages subscriber authentication during registration or re-registration with the NGCN 422, which obtains authentication vectors from the UDM 412. The UDM 412 is the evolution of HLR/HSS 214 in FIG. 2 and Unified Data Repository (UDR) (not pictured), which is the evolution of the LTE Structured Data Storage (SDS) (not pictured). The UDR can store structured data (e.g., subscriber profile, policy, app data, etc.) that can be exposed to a Network Function (NF) such as the AMF 414 and the SMF 418, which interface with the UDM 412.

The SMF 418 provides functions such as user device IP address allocation and PDU session control. The SMF 418 interfaces with the Policy Control Function (PCF) 428, which provides policy control similar to the Policy and Charging Rules Function (PCRF) (not pictured) of an LTE network. The PCF 428 maintains a traditional diameter protocol-based interface to an Application Function (AF) 426 but is also enhanced to allow for resource reservation requests using an HTTP/XML-based interface from other services.

The UPF 420 provides functions such as mobility anchoring (e.g., anchoring the user device IP addresses) and protocol data unit (PDU) handling. The UPF 420 also provides the Quality of Service (QoS) enforcement function. The SMF 418 replaces together with the UPF 420 the SGW 210 and PGW 222 in FIG. 2 of the LTE network.

The NGCN 422 further includes a N3IWF 416. The N3IWF 416 is similar to the ePDG 218 in FIG. 2 of the LTE network, which serves as a secure gateway for the user device to access non-trusted networks, such as Wi-Fi and the public Internet (e.g., Data Network [DN] 430). The AMF 414 may store the address of the N3IWF 416 that is handling the user device session. The address of the N3IWF 416 can include an IP address, MAC address, port number, and/or other such unique identifiers that identify the N3IWF 416. The N3IWF 416 receives, from the user device 402, measurement report 432 indicating network conditions (e.g., RF conditions). The N3IWF 416 may interface with the AMF 414 via the N2 interface 434 to deliver the measurement report 432 to the AMF 414.

The N3IWF 416 also transports NAS messages from the user device over non-trusted networks and AMF selection. The user device 402 may perform a network registration from networks other than the NG-RAN 406 (e.g., LTE network of FIG. 2). When the user device 402 is connected to the NG-RAN 406 and Wi-Fi (e.g., via the access point 408), the user device 402 will have two distinct active NAS connections with the AMF 414.

Figure 5:
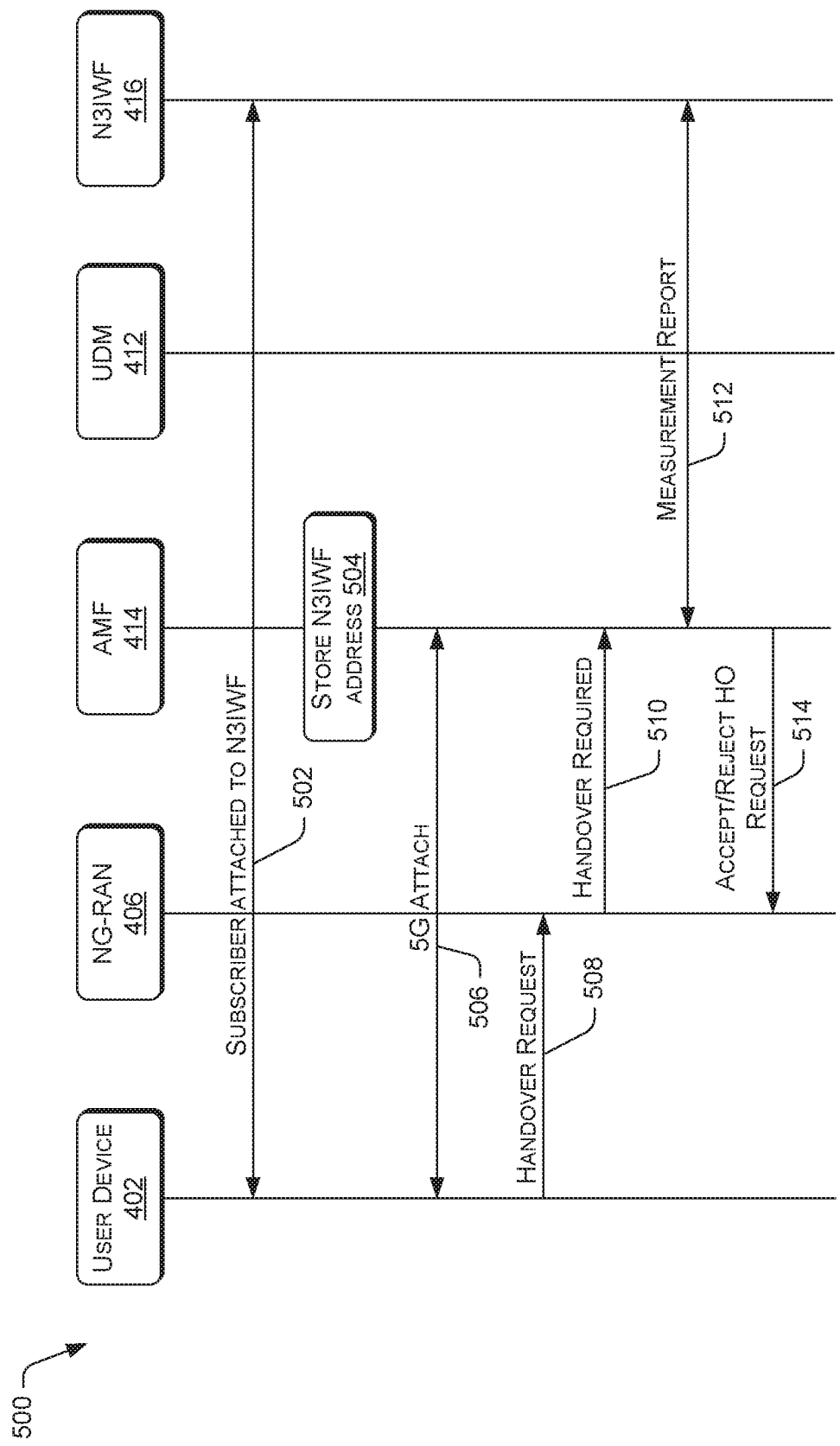
FIG. 5 is a protocol flow diagram showing an example handover process from a Wi-Fi network to a 5G network.

In one aspect, the user device 402 may request a handover between access networks. For instance, the user device 402 may request a handover from a Wi-Fi network to the 5G network. A protocol flow diagram showing an example handover process from the Wi-Fi network to the 5G network is shown in FIG. 5.

At 502, the user device 402 that is associated with a subscriber is attached to the N3IWF 416. The user device 402 may provide measurement reports to the N3IWF 416, wherein the measurement reports can indicate network conditions. In some aspects, the user device 402 may report received signal strength or power of reference signals (e.g., RSSI, RSRP, RSRQ, etc.) at regular intervals to the N3IWF 416.

At 504, the AMF 414 stores N3IWF address of the N3IWF 416 that is handling the user device session. At 506, the user device 402 may perform 5G attach procedures. At 508, the user device 402 may send a handover request to a base station. The base station can be a part of the NG-RAN 406 as described in FIG. 4. The base station is configured to wirelessly interface with the user device 402 to enable access to the core network, the Internet, and/or other networks. The base station may include one or more radio access nodes, a site controller, an access point (AP), or a wireless router, or a server, router, switch, or other processing entity with a wired or wireless network. In the illustrated embodiment, the base station comprises gNodeB 104.

At 510, the gNodeB 104 transmits a handover-required message to the AMF 414. The AMF 414 may identify the N3IWF 416 that is handling the user device session based at least on the N3IWF address. Upon identifying the N3IWF 416 that is serving the user device 402, the AMF 414 may interface with the N3IWF 416 via the N2 interface to receive the measurement reports, as shown at 512. The measurement reports include one or more measurements obtained via the user device 202 indicating network conditions in real-time or near real-time. For instance, the measurements may indicate whether the available cellular signal is marginal or unstable. Based at least on the measurement reports, the AMF 414 may reject or accept the handover request from the user device 402 at shown at 514.

Example Computing Device Components

Figure 6:
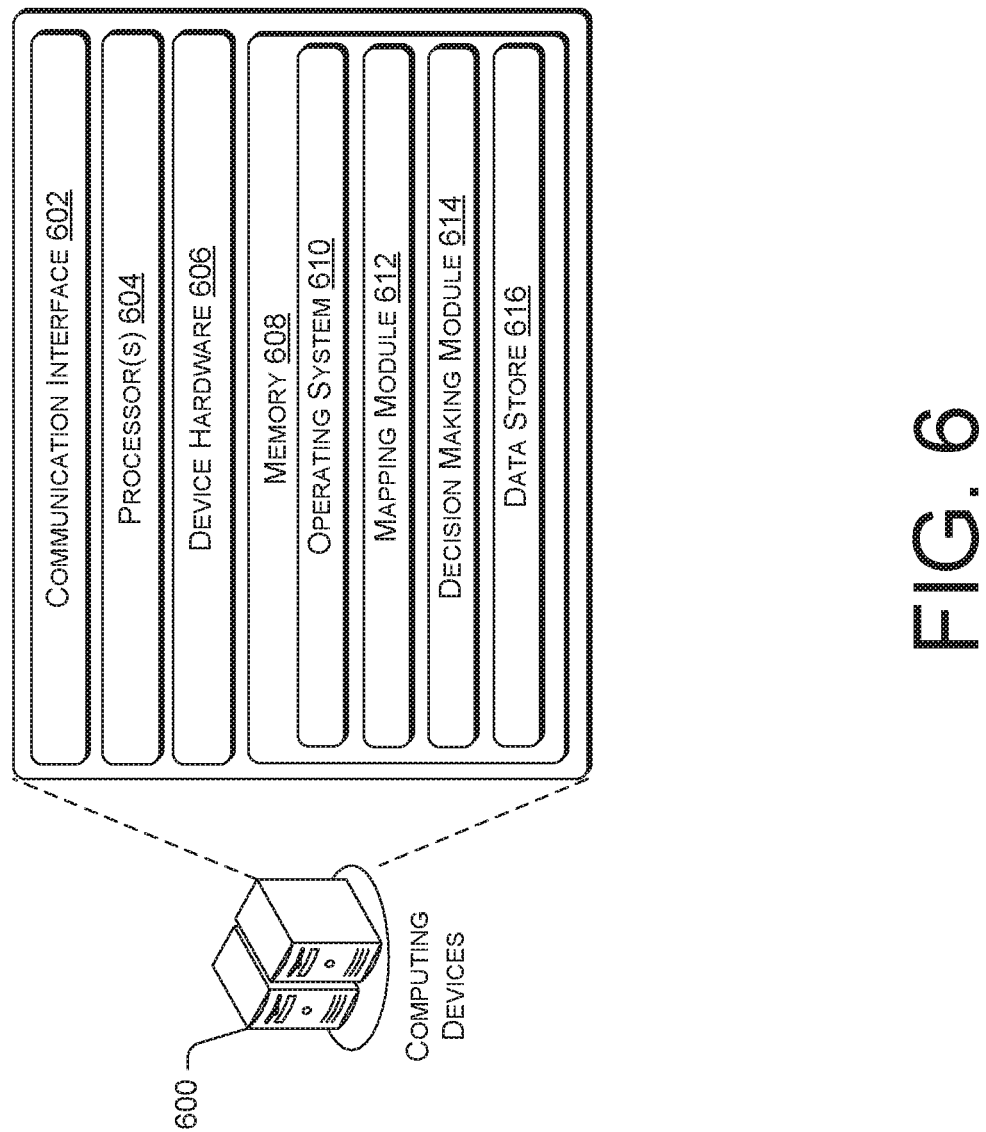
FIG. 6 is a block diagram showing various components of an illustrative computing device that makes handover decisions based on network conditions.

FIG. 6 is a block diagram showing various components of illustrative computing devices 600, wherein the computing devices 600 can comprise an MME or an AMF, depending upon embodiments. It is noted that the computing devices 600 as described herein can operate with more or fewer of the components shown herein. Additionally, the computing devices 600 as shown herein or portions thereof can serve as a representation of one or more of the computing devices of the present system.

The computing devices 600 may include a communication interface 602, one or more processors 604, device hardware 606, and memory 608. The communication interface 602 may include wireless and/or wired communication components that enable the computing devices 600 to transmit data to and receive data from other networked devices. In at least one example, the one or more processor(s) 604 may be a central processing unit(s) (CPU), graphics processing unit(s) (GPU), both a CPU and GPU or any other sort of processing unit(s). Each of the one or more processor(s) 604 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution.

The one or more processor(s) 604 may also be responsible for executing all computer applications stored in the memory, which can be associated with common types of volatile (RAM) and/or nonvolatile (ROM) memory. The device hardware 606 may include additional user interface, data communication, or data storage hardware. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices.

The memory 608 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 608 may also include a firewall. In some embodiments, the firewall may be implemented as device hardware 606 in the computing devices 600.

The processors 604 and the memory 608 of the computing devices 600 may implement an operating system 610, a mapping module 612, a decision making module 614, and a data store 616. The operating system 610 may include components that enable the computing devices 600 to receive and transmit data via various interfaces (e.g., user controls, communication interface, and/or memory input/output devices), as well as process data using the processors 604 to generate output. The operating system 610 may include a presentation component that presents the output (e.g., display the data on an electronic display, store the data in memory, transmit the data to another electronic device, etc.). Additionally, the operating system 610 may include other components that perform various additional functions generally associated with an operating system.

The mapping module 612 and the decision making module 614 may include routines, program instructions, objects, and/or data structures that perform particular tasks or implement particular abstract data types. The mapping module 612 may include one or more instructions, which when executed by the one or more processors 604 direct the computing devices 600 to perform operations related to identifying ePDGs serving user devices or N3IWF handling user device session. In one example, the mapping module 612 may request, from the HLR/HSS, the address of the ePDG serving the user device that requests handover. Upon receiving the ePDG address of the serving ePDG, the mapping module 612 may associate the ePDG address with the serving ePDG in order to identify the ePDG corresponding to the ePDG address.

In another example, the computing devices 600 may store the address of the ePDG and/or the N3IWF in the data store 616. The data store 616 can comprise a data management layer that includes software utilities for facilitating the acquisition, processing, storing, reporting, and analysis of data from multiple data sources. For example, the data store 616 may request ePDG addresses from the HLR/HSS. The mapping module 612 may, in turn, identify the serving ePDG or the N3IWF based at least on the stored address of the ePDG or the N3IWF, respectively.

The decision making module 614 may include one or more instructions, which when executed by the one or more processors 604, direct the computing devices 600 to perform operations related to accepting or rejecting handover requests from user devices. In some aspects, the decision making module 614 may be configured to accept or reject a handover request from a user device based at least on one or more measurements in a measurement report from the requesting user device. The measurements in the measurement report may indicate network conditions such as RF conditions. The measurement report can include RSSI, RSRP, and/or RSRQ levels. In one example, if the measurement report indicates that the RSRP level exceeds a first predetermined signal strength threshold, then the decision making module 614 may accept the handover request. In another example, if the measurement report indicates that the RSSI level does not exceed a second predetermined signal strength threshold but the RSRP level exceeds a third predetermined signal strength threshold, then the decision making module 614 may accept the handover request. However, in such an example if the measurement report indicates that the RSSI level exceeds the second predetermined signal strength threshold, then the decision making module 614 may reject the handover request. In other instances, the decision making module 614 may make use of other combinations signal measurement levels and corresponding predetermined signal measurement thresholds to accept or reject handover requests.

Example Processes

Figure 7:
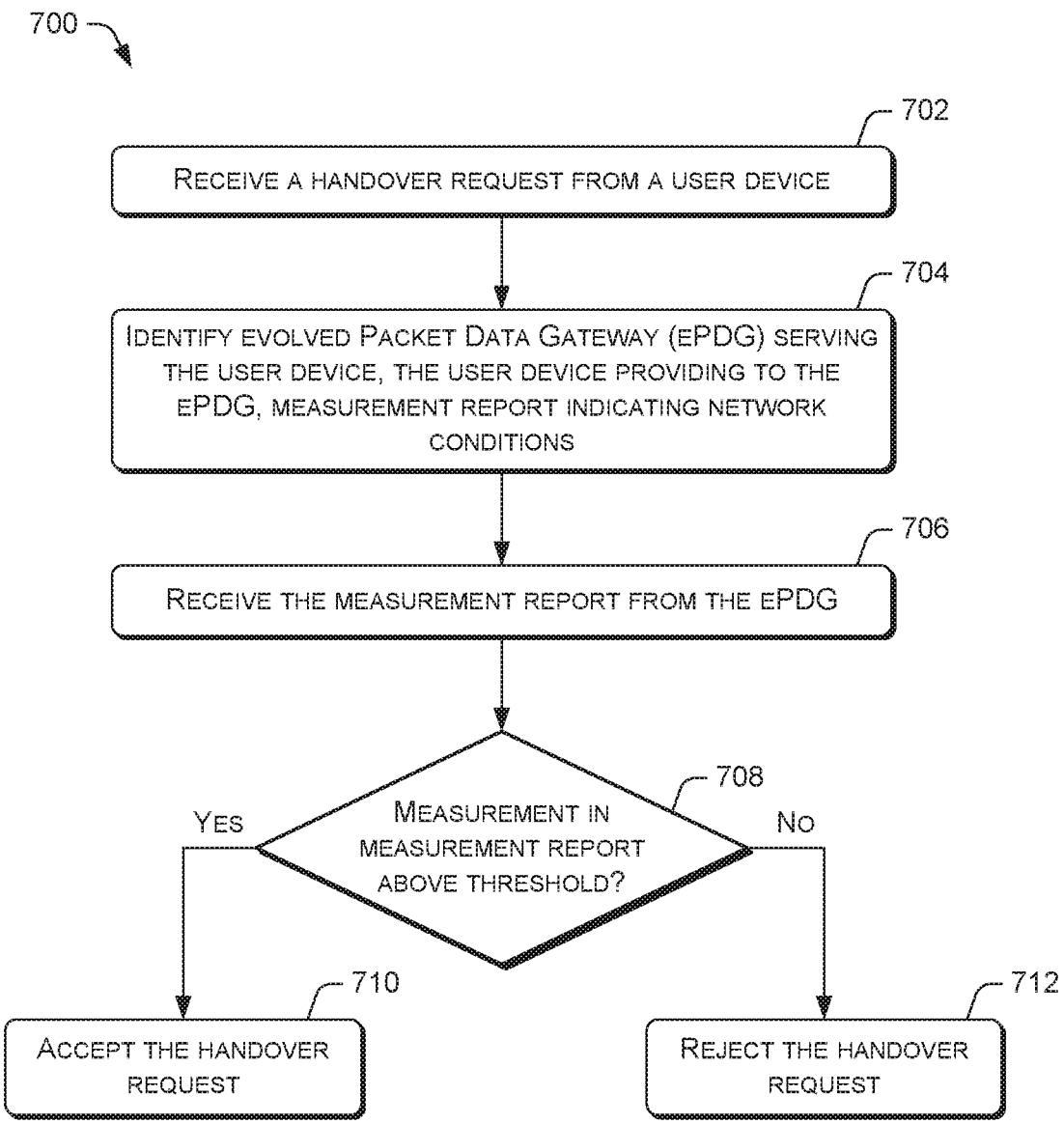
FIG. 7 is a flow diagram of an example process for making a handover decision from the perspective of a Mobility Management Entity (MME).
Figure 8:
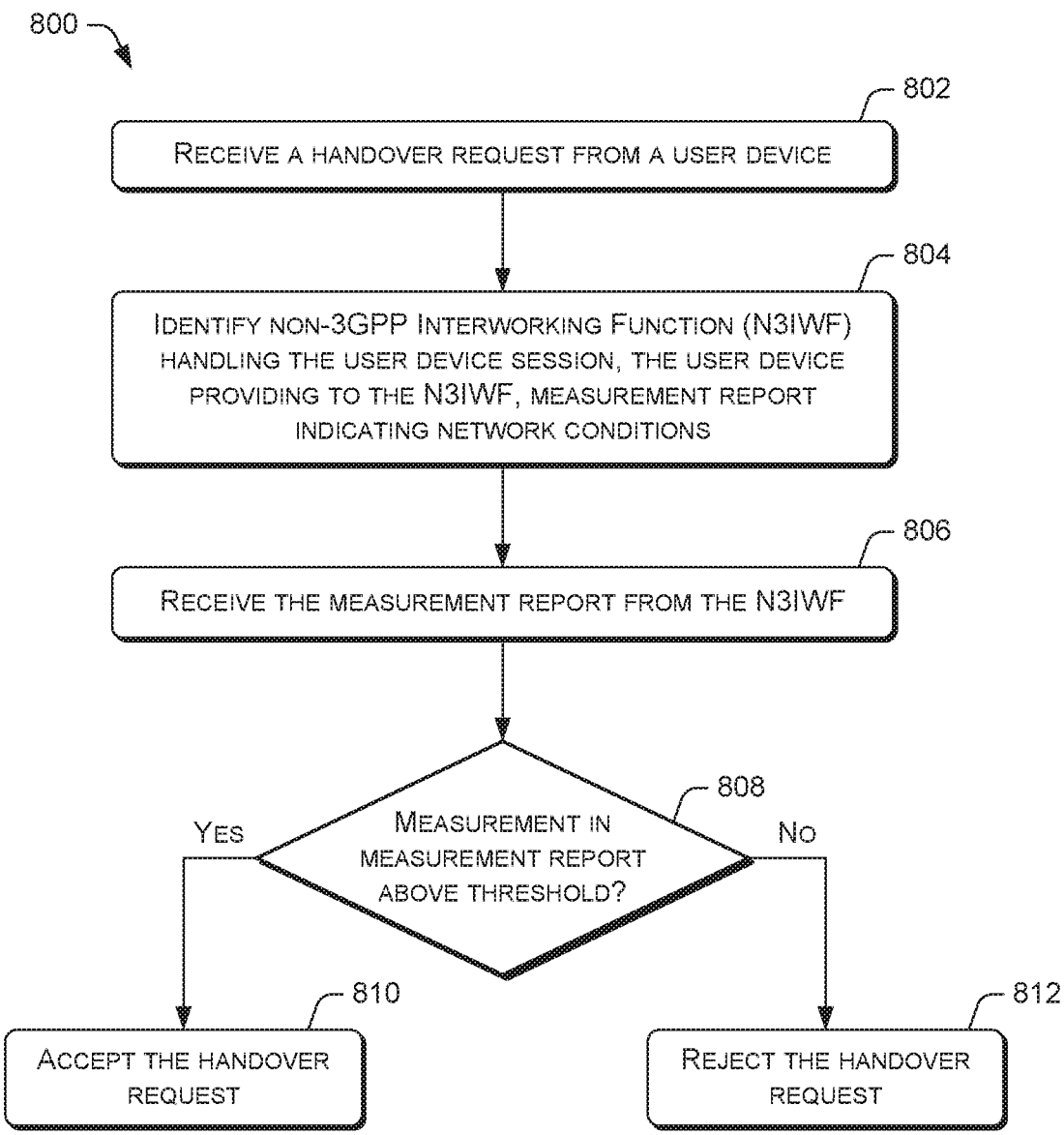
FIG. 8 is a flow diagram of an example process for making a handover decision from the perspective of an Access and Management Mobility Function (AMF).
Figure 9:
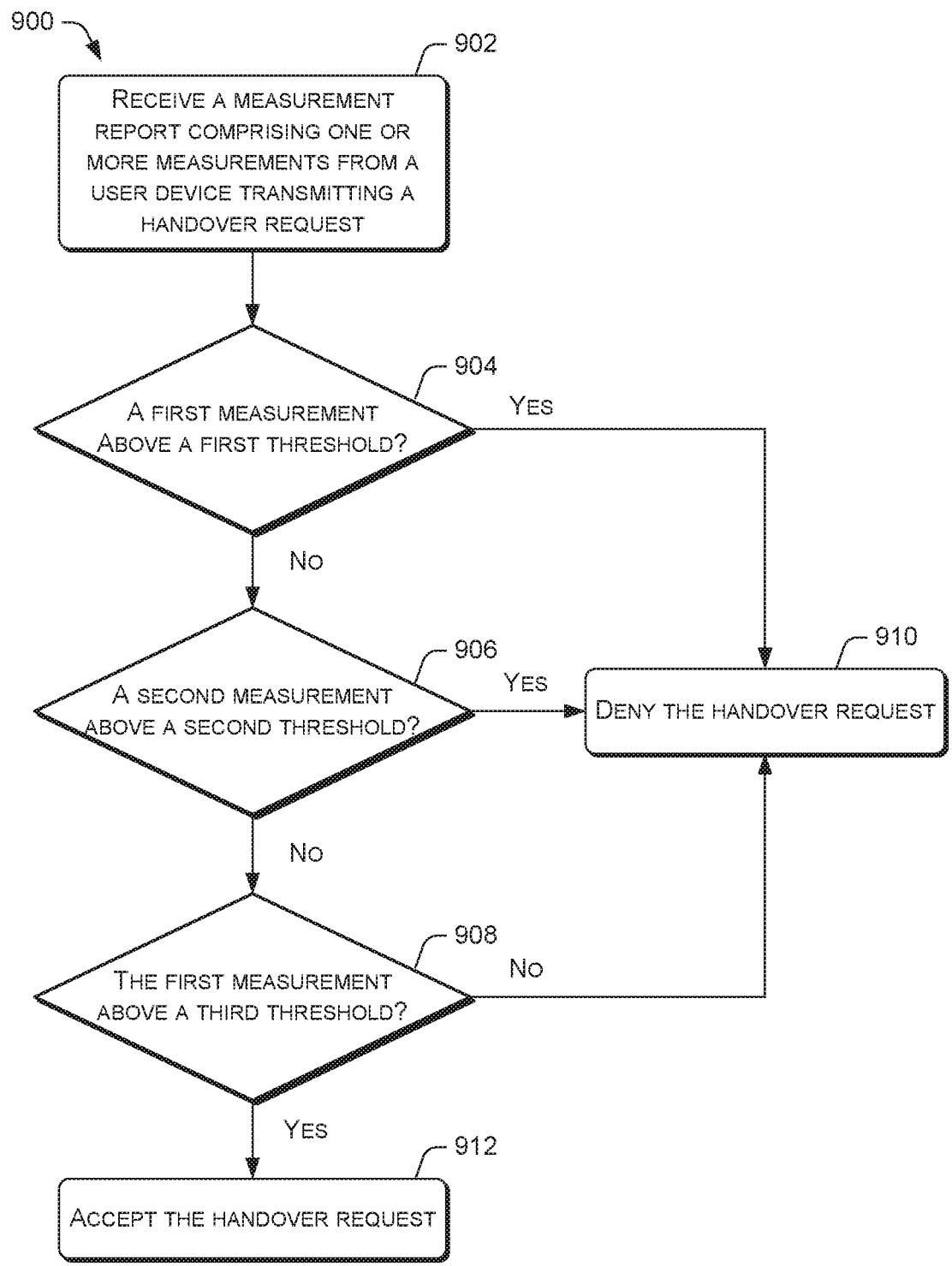
FIG. 9 is a flow diagram of an example process 900 for making a handover decision from the perspective of an MME or an AMF.

FIGS. 7-9 present illustrative processes 700-900 for making handover decisions. The processes 700-900 are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 700-900 are described with reference to FIGS. 1-6.

FIG. 7 is a flow diagram of an example process 700 for making a handover decision from the perspective of an MME. At block 702, the MME receives a handover request comprising from a user device. At block 704, the MME identifies an ePDG serving the user device. In one aspect, the MME requests an ePDG address from the HLR/HSS and identifies the serving ePDG based at least on the ePDG address. The user device provides a measurement report to the ePDG, wherein the measurement report indicates network conditions. In some aspects, the user device populates RSSI, RSRP, and/or RSRQ measurements at regular intervals to the ePDG. At block 706, the MME receives the measurement report from the ePDG serving the user device. In some examples, the MME and the ePDG may interact via a newly created interface such as the S1x interface. At decision block 708, the MME determines whether a measurement (e.g., RSSI level, RSRP level, or RSRQ level) in the measurement report is above a predetermined threshold. If the measurement is above the threshold ("yes" from block 708), then the MME accepts the handover request, as indicated in block 710. If the measurement is below the threshold ("no" from block 708), then the MME rejects the handover request, as indicated in block 712.

FIG. 8 is a flow diagram of an example process 800 for making a handover decision from the perspective of an AMF. At block 802, the AMF receives a handover request comprising from a user device. At block 804, the AMF identifies N3IWF handling the user device session. In one aspect, the AMF may identify the serving N3IWF based at least on the N3IWF address. The user device provides a measurement report to the N3IWF, wherein the measurement report indicates network conditions. In some aspects, the user device populates RSSI, RSRP, and/or RSRQ at regular intervals to the N3IWF. At block 806, the AMF receives the measurement report from the N3IWF serving the user device. In some aspects, the AMF may request and receive the measurement report via the N2 interface that exists between the AMF and the N3IWF. At decision block 808, the AMF determines whether a measurement (e.g., RSSI level, RSRP level, or RSRQ level) in the measurement report is above a predetermined threshold. If the measurement is above the threshold ("yes" from block 808), then the AMF accepts the handover request, as indicated in block 810. If the measurement is below the threshold ("no" from block 808), then the AMF rejects the handover request, as indicated in block 812.

FIG. 9 is a flow diagram of an example process 900 for making a handover decision from the perspective of an MME or an AMF. At block 902, the MME or the AMF may receive a measurement report that includes one or more measurements. For instance, the measurement report can include RSSI levels and RSRP levels. The individual measurements may correspond to a predetermined threshold. Accordingly, the MME or the AMF may engage in multiple decision making process to determine whether to accept or reject the handover request based at least on one or more measurements.

For example, at decision block 904, the MME or the AMF may determine whether a first measurement (e.g., RSRP level) is above or below a first predetermined threshold. If the first measurement is below the first predetermined threshold ("no" from block 904), then the MME or the AMF may determine whether a second measurement (e.g., RSSI level) is above or below a second predetermined threshold as shown in decision block 906. If the first measurement is above the first predetermined threshold ("yes" from block 904), then the MME or the AMF may deny the handover request as shown in block 910.

If the second measurement is below the second predetermined threshold ("no" from block 906), then the MME or the AMF determines whether the first measurement (e.g., RSRP level) is above or below a third predetermined threshold as shown in decision block 908. For example, the third predetermined threshold is a threshold that is higher than the first predetermined threshold. If the second measurement is above the second predetermined threshold ("yes" from block 906), then the MME or the AMF denies the handover request as shown in block 910. If the first measurement is above the third predetermined threshold ("yes" from block 908), then the MME or the AMF may accept the handover request as shown in block 912. Conversely, if the first measurement is below the third predetermined threshold ("no" block block 908), then the MME or the AMF may reject the handover request as shown in block 910.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:

receiving a handover request from a user device connected to a first access network;
identifying an evolved packet data gateway (ePDG) serving the user device;
responsive to receiving the handover request from the user device and identifying the ePDG serving the user device, receiving by the ePDG, measurement report indicating network conditions that is provided from the user device;
receiving the measurement report from the ePDG;
determining whether a measurement in the measurement report is above a predetermined threshold; and
in response to determining that the measurement is above the predetermined threshold, accepting the handover request to enable the user device to connect to a second access network.

2. The one or more non-transitory computer-readable media of claim 1, wherein the acts further comprise:
creating a new communication interface between the one or more non-transitory computer-readable media and the ePDG, and wherein the measurement report from the ePDG is received via the new communication interface.

3. The one or more non-transitory computer-readable media of claim 1, wherein the acts further comprise:
requesting an ePDG address from a Home Location Register (HLR)/Home Subscriber Server (HSS), the ePDG address associated with the ePDG, wherein the ePDG is identified based at least on the ePDG address.

4. The one or more non-transitory computer-readable media of claim 1, wherein the first access network comprises a Wi-Fi network.

5. The one or more non-transitory computer-readable media of claim 1, wherein the second access network comprises a $3^{rd}$ Generation Partnership Project (3GPP) network.

6. The one or more non-transitory computer-readable media of claim 1, wherein the measurement indicates radio frequency (RF) conditions.

7. The one or more non-transitory computer-readable media of claim 1, wherein the one or more non-transitory computer-readable media comprises an on-premise server.

8. The one or more non-transitory computer-readable media of claim 1, wherein performing the act of providing to the ePDG by the user device, measurement report indicating network conditions includes providing the measurement report from the user device to the ePDG via an access point.

9. The one or more non-transitory computer-readable media of claim 8, wherein the access point includes a Non-3GPP Interwork Function (N3IWF).

10. A computer-implemented method, comprising:
receiving a handover request from a user device connected to a first access network;
identifying an evolved packet data gateway (ePDG) serving the user device;
responsive to receiving the handover request from the user device and identifying the ePDG serving the user device, receiving by the ePDG, measurement report indicating network conditions that is provided from the user device;
receiving the measurement report from the ePDG;
determining whether a measurement in the measurement report is above a predetermined threshold; and in response to determining that the measurement is above the predetermined threshold, accepting the handover request to enable the user device to connect to a second access network.

11. The computer-implemented method of claim 10, further comprising:
creating a new communication interface between the one or more non-transitory computer-readable media and the ePDG, and wherein the measurement report from the ePDG is received via the new communication interface.

12. The computer-implemented method of claim 10, further comprising:
requesting an ePDG address from a Home Location Register (HLR)/Home Subscriber Server (HSS), the ePDG address associated with the ePDG, wherein the ePDG is identified based at least on the ePDG address.

13. The computer-implemented method of claim 10, wherein the first access network comprises a Wi-Fi network.

14. The computer-implemented method of claim 10, wherein the second access network comprises a $3^{rd}$ Generation Partnership Project (3GPP) network.

15. The computer-implemented method of claim 10, wherein the measurement indicates radio frequency (RF) conditions.

16. The computer-implemented method of claim 10, wherein the one or more non-transitory computer-readable media comprises a Mobility Management Entity (MME).

17. The computer-implemented method of claim 10, wherein the step of providing to the ePDG by the user device, measurement report indicating network conditions includes providing the measurement report from the user device to the ePDG via an access point.

18. The computer-implemented method of claim 17, wherein the access point includes a Non-3GPP Interwork Function (N3IWF).

* * * * *